(12) United States Patent
Keller et al.

(10) Patent No.: US 10,206,275 B2
(45) Date of Patent: Feb. 12, 2019

(54) CONTROL UNIT HAVING A SACRIFICIAL STRUCTURE

(71) Applicant: CONTINENTAL AUTOMOTIVE GMBH, Hannover (DE)

(72) Inventors: Jan Keller, Lappersdorf (DE); Thomas Riepl, Bad Abbach (DE)

(73) Assignee: Continental Automotive GmbH, Hannover (DE)

( * ) Notice: Subject to any disclaimer, the term of this patent is extended or adjusted under 35 U.S.C. 154(b) by 283 days.

(21) Appl. No.: 14/364,765

(22) PCT Filed: Dec. 11, 2012

(86) PCT No.: PCT/EP2012/075095
§ 371 (c)(1),
(2) Date: Jun. 12, 2014

(87) PCT Pub. No.: WO2013/087632
PCT Pub. Date: Jun. 20, 2013

(65) Prior Publication Data
US 2014/0328029 A1 Nov. 6, 2014

(30) Foreign Application Priority Data

Dec. 12, 2011 (DE) .......................... 10 2011 088 216

(51) Int. Cl.
*H05K 5/00* (2006.01)
*H05K 1/02* (2006.01)
(Continued)

(52) U.S. Cl.
CPC ........... *H05K 1/0275* (2013.01); *G06F 21/86* (2013.01); *G06F 21/87* (2013.01); *H05K 13/00* (2013.01);
(Continued)

(58) Field of Classification Search
CPC .......... H05K 1/11; H05K 1/181; H05K 1/182; H05K 1/186; H05K 2201/09218;
(Continued)

(56) References Cited

U.S. PATENT DOCUMENTS 5,641,996 A * 6/1997 Omoya ................. H01L 21/563
257/780
6,028,773 A * 2/2000 Hundt .................. G06K 9/0002
174/250
(Continued)

FOREIGN PATENT DOCUMENTS

CN 1279797 A 1/2001
DE 10221086 A1 11/2003
(Continued)

*Primary Examiner* — Binh Tran
(74) *Attorney, Agent, or Firm* — Laurence A. Greenberg; Werner H. Stemer; Ralph E. Locher

(57) ABSTRACT

A control unit has a substrate with an electrically conductive structure, an integrated circuit device, which is installed on the substrate in an electrically conductive manner, and a sacrificial structure on the substrate. The sacrificial structure is configured to be irreversibly destroyed if the integrated circuit device is removed from the substrate. The electrically conductive structure has at least one conducting track applied to the substrate. The sacrificial structure is formed by a segment of the conducting track. An electrically insulating connecting layer that connects the integrated circuit device, the substrate, and the segment of the conducting track is formed. The sacrificial structure can be destroyed by the connecting layer when the integrated circuit device is removed.

12 Claims, 3 Drawing Sheets

(51) Int. Cl.
*H05K 13/00* (2006.01)
*G06F 21/87* (2013.01)
*G06F 21/86* (2013.01)
*H05K 7/00* (2006.01)
*H05K 1/18* (2006.01)
*H05K 1/11* (2006.01)
*H05K 3/28* (2006.01)

(52) U.S. Cl.
CPC ........ *G06F 2221/2101* (2013.01); *H05K 1/11* (2013.01); *H05K 1/181* (2013.01); *H05K 1/182* (2013.01); *H05K 3/28* (2013.01); *H05K 2201/09218* (2013.01); *H05K 2201/09681* (2013.01); *H05K 2201/10159* (2013.01); *H05K 2203/175* (2013.01); *H05K 2203/178* (2013.01)

(58) Field of Classification Search
CPC .......... H05K 2201/09227; H05K 2201/10689; H05K 2201/0239; H05K 3/321; H05K 2201/10287; H01L 23/12; H01L 23/48; H01L 2021/60; H01G 13/006
USPC ....... 361/760, 761, 764, 767, 772, 777, 779, 361/783; 174/549, 551, 554, 259
See application file for complete search history.

(56) References Cited

U.S. PATENT DOCUMENTS

| | | | |
|---|---|---|---|
| 6,362,518 B1* | 3/2002 | Yatsuda | H01L 21/50 257/678 |
| 7,215,021 B2* | 5/2007 | Yogo | G01F 1/6842 257/48 |
| 7,434,736 B2 | 10/2008 | Nicolas | |
| 2002/0179721 A1 | 12/2002 | Elbaz et al. | |
| 2004/0140571 A1* | 7/2004 | Tomura | H01L 23/498 257/778 |
| 2006/0150255 A1 | 7/2006 | Ceskutti | |
| 2006/0158861 A1* | 7/2006 | Shouji | H01L 23/4985 361/750 |

FOREIGN PATENT DOCUMENTS

| | | |
|---|---|---|
| DE | 10359088 A1 | 7/2005 |
| DE | 102004057259 A1 | 6/2006 |
| EP | 1045352 A1 | 10/2000 |
| EP | 1462907 A1 | 9/2004 |
| EP | 2211289 A1 | 7/2010 |

\* cited by examiner

CONTROL UNIT HAVING A SACRIFICIAL STRUCTURE

BACKGROUND OF THE INVENTION

Field of the Invention

The invention relates to a control unit. The invention relates further to a vehicle having a control unit. In addition, the invention relates to a method for detecting manipulation of a control unit.

The application claims the priority of the German patent application no. 102011088216.2, the disclosure of which is included herein by reference.

The term 'tuning' generally describes an individual modification in a visual appearance, performance or another characteristic of a device, by way of example a vehicle. It is popular to make individual modifications to different components of the motor vehicle, in particular in the case of motor vehicles, such as for example passenger cars and/or motorcycles. By way of example, it is possible to increase the engine performance of the vehicle by means of manipulating an engine control unit (ECU) of the vehicle. It is possible for this purpose to modify and/or replace and/or remove by way of example one or multiple integrated switching devices of the engine control unit. This type of tuning is also described as chip tuning. The tuning, in particular the chip tuning is frequently performed by third parties who are not approved and/or licensed by the manufacturer of the device.

Any modification to a component of a device can indeed impair the life expectancy and/or the reliability of the modified component of the device and/or of the entire device. In particular, a modification to a control unit can impair the life expectancy and/or the reliability of a component that is controlled by means of the control unit.

A manufacturer generally does not have the possibility of preventing chip tuning—in particular if entire integrated switching devices are replaced—although manipulation can greatly impair the reliability of a product. Different measures are known that can be used in order to protect parts of a device by way of example from dust and/or air moisture and/or mechanical overloading. It is possible for this purpose to apply a sealing material and/or a protective material on the parts that are to be protected. However, the sealing material and/or the protective material can be removed and re-applied, it is therefore often not possible to differentiate between unauthorized manipulations and authorized repairs.

BRIEF SUMMARY OF THE INVENTION

The object of the invention is to improve the detection of manipulation of a control unit.

This object is achieved by virtue of the subjects of the independent claims. Advantageous embodiments of the present invention are described in the dependent claims.

A control unit, in particular an engine control unit, is disclosed in accordance with a first aspect, wherein the control unit comprises a substrate having an electrically conductive structure, an integrated switching device and a sacrificial structure on the substrate. The integrated switching device is mounted in an electrically conductive manner on the substrate. The sacrificial structure is designed so as to be irreversibly destroyed if the integrated switching device is removed from the substrate. The electrically conductive structure comprises in particular at least one conducting track that is applied on and/or in the substrate. By way of example, the substrate having the electrically conductive structure can be a printed circuit board (PCB). The electrically conductive structure can however also comprise a base that is suitable for mounting an integrated switching device and/or a processor and/or a micro-controller on the substrate in such a manner that said components can be removed from said substrate.

The term 'integrated switching device' is understood to mean in particular a semiconductor component. By way of example, the integrated switching device can comprise a microchip and/or a micro-controller and/or a micro-processor, in particular in a housing. The integrated switching device can comprise a storage medium and/or can be connected to a storage medium in which the instruction code is stored. In the case of one embodiment, the storage medium is embodied in a monolithic integrated manner with the micro-controller and/or micro-processor, i.e. in particular in and/or on a one piece silicon substrate. In the case of one embodiment, an instruction code is implemented in a suitable programming language in the integrated switching device.

The integrated switching device can be mounted in such a manner that the sacrificial structure is arranged below and/or at the side of the integrated switching device. The sacrificial structure can be by way of example an arrangement of one or multiple metals. By way of example, the sacrificial structure can be formed from copper and/or gold and/or silver and/or aluminum. The sacrificial structure can be for example a lattice and/or a net and/or a film and/or a scale-like arrangement. The sacrificial structure can further be coated on one surface. By way of example, the upper structure can be coated on the surface with a metal and/or organic material. In particular, a coating can be applied to the surface of the sacrificial structure in the form of oxidation protection. Furthermore, the coating can have adhesive properties.

It is preferred that the sacrificial structure is formed by a section of the at least one conducting track that is applied to the substrate. The conducting track that comprises a section that is embodied as the sacrificial structure can be provided for the purpose of electrically contacting the integrated switching device. By way of example, said conducting track is connected to an electrical connection of the integrated switching device.

The section of the at least one conducting track, said section being embodied as the sacrificial structure, has for example a lattice-like, net-like or mesh-like form, in particular as seen in a plan view of a main surface of the substrate, said main surface supporting the conducting track. The part pieces of the section that is embodied as a sacrificial structure, said part pieces forming the lattice or rather the net or rather the mesh, have in the case of an expedient embodiment a cross section that is reduced, for example by at least 50%, preferably 75% or more, with respect to a cross section of a further section that is adjacent to this section.

It is further preferred that the control unit comprises an electrically insulating connecting layer—for example a resin layer—that connects to one another the integrated switching device, the substrate and the section of the conducting track that is embodied as the sacrificial layer, and the sacrificial structure can be destroyed by means of said electrically insulating connecting layer as the integrated switching device is removed. In particular, it is not possible to detach in a non-destructive manner the connection, which is produced by means of the connecting layer, between the integrated switching device and the section of the at least one conducting track, said section being embodied as the sacrificial structure. The risk of unintentional damage to the sacrificial structure, by way of example as a result of mechanical loading on the control unit by means of vibration, is reduced in an advantageous manner by virtue of connecting the integrated switching device to the substrate.

In many modern devices, in particular in vehicles, control units also have safety-related functions in addition to control functions. If damage occurs to a component of the device and/or to the entire device, it is possible under certain circumstances for a warranty claim to be made against a manufacturer of the device. In particular, manipulation of a control unit can cause damage to a multiplicity of components of the device. In particular, the safety-related functions of a control unit can be lost when an integrated control unit is replaced. It can therefore be of interest to the manufacturer to be able to differentiate between an authorized modification and an unauthorized manipulation and/or unauthorized modification to a control unit.

One advantage of the described control unit can be that an indication remains on a substrate of the motor control unit showing that an integrated switching device of the motor control unit has been manipulated.

In the case of one embodiment of the control unit, the electrically insulating connecting layer of the integrated switching device—in particular of a housing of the integrated switching device—is provided at the side adjacent to the integrated switching device on the substrate and adjacent to the section of the conducting track that is embodied as the sacrificial structure. In the case of this embodiment, the connecting layer can be applied in a particularly simple manner after assembling the integrated switching device. In the case of an alternative embodiment, the electrically insulating connecting layer and the sacrificial structure are covered by the integrated switching arrangement as seen in the plan view of the substrate—in particular on a main surface of the substrate, said main surface supporting the integrated switching device. In the case of this embodiment, it is particularly difficult to remove the integrated switching device without damaging the sacrificial structure.

In the case of one embodiment of the control unit, the at least one conducting track is covered in part by a lacquer coat, in particular by a lacquer coat of solder resist. The lacquer coat has an opening by means of which the section of the conducting track is laid bare, said section being embodied as the sacrificial structure. In the case of a further development, the connecting layer fills the opening of the lacquer coat at least in part so that the connecting layer in the opening adjoins the substrate and the section of the conducting track, said section being embodied as the sacrificial structure.

In accordance with one embodiment, the sacrificial structure is designed in such a manner that, when the sacrificial structure is destroyed, a marker, in particular a visual and/or electrical marker and/or marker that is apparent in a haptic manner, remains in place.

It can be in particular an advantage that a visual and/or electrical marker and/or a marker that is apparent in a haptic manner is easily noticeable. By way of example, the marker is even apparent to the naked eye. A further possibility can be that the marker is apparent by means of performing an electrical measurement. In particular, the visible and/or electrical marker and/or a marker that is apparent in a haptic manner can render it possible to detect in an objective and simple manner if the control unit has been manipulated.

In accordance with a further embodiment, the sacrificial structure is embodied in such a manner that a loss of function of the control unit occurs when the sacrificial structure is destroyed. By way of example, a signal line to the integrated switching device is interrupted when the section of the at least one conducting track is destroyed, said section being embodied as the sacrificial structure.

In particular, a loss of a function of the control unit can indicate clearly and in a simple manner that the control unit has been manipulated by means of an unauthorized third person. By way of example, the loss can affect a function of the entire control unit so that for example the device is no longer able to function. If the unit concerned is the control unit, for example an engine control unit of a vehicle, then the loss of a function of the control unit can mean that the vehicle can no longer be started. Another possibility is that the loss affects a function of a control section of the control unit. This could be read out by way of example by means of a diagnostic device and/or indicated by means of a control light. In accordance with a further embodiment, the connecting layer connects at least a part of the sacrificial structure and a part of the integrated switching device.

In particular, the connecting layer can be applied below and/or on at least one face of the integrated switching device. The connecting layer can further also be applied over and/or under the entire integrated switching device. The connecting layer can comprise by way of example a solid material or can be embodied from a solid material. The solid material can by way of example be brittle or elastic. Furthermore, the connecting layer can be a liquid material—at least during the manufacture of the connecting layer. The liquid material can solidify in an expedient manner; by way of example said material is a resin such as epoxy resin or silicon resin.

In the case of one embodiment, the connecting layer has adhesive properties, in particular the connecting layer comprises an adhesive and/or a resin. By way of example, an adhesion between the connecting layer and the sacrificial structure is greater than an adhesion between the substrate and the sacrificial structure. The adhesion of the material of the connecting layer is selected in particular in such a manner that as the integrated switching device is removed from the substrate at least one part of the sacrificial structure is destroyed.

In particular, the connecting layer that is embodied from a material that has adhesive properties can also be used for other purposes. By way of example, a further purpose can be the adhering of two parts to one another, in particular the adhering of the integrated switching device to the substrate. Furthermore, a further purpose can be to seal a part. In accordance with a further embodiment, the material of the connecting layer is an organic material.

In particular, the material, by way of example an organic material, can also be used for other purposes.

By way of example, the material or rather the organic material can be an adhesive means.

In accordance with a further embodiment, the adhesion of the material of the connecting layer is selected so that as the integrated switching device is removed from the substrate at least one part of the sacrificial structure is destroyed.

It is thus possible in an advantageous manner to ensure in a simple manner that the sacrificial structure is destroyed as soon as the integrated switching device is removed from the substrate.

A vehicle having a control unit in accordance with one aspect is proposed in accordance with a further aspect.

In particular, the control unit can be an engine control unit of the vehicle.

In accordance with a further aspect, a method for detecting manipulation of a control unit is proposed, wherein the method comprises:

provided a substrate having an electrically conductive structure, providing an integrated switching device that is mounted in an electrically conductive manner on the substrate, providing a sacrificial structure on the substrate, said sacrificial structure being designed so as to be irreversibly destroyed as the integrated switching device is removed from the substrate, and testing the condition of the sacrificial structure for the purpose of detecting manipulation of the control unit.

It is possible by testing the condition of the sacrificial structure to detect manipulation of the control unit which is indicated by means of the irreversible destruction of the sacrificial structure. The process of testing the condition of the sacrificial structure includes for example measuring the electrical conductivity of the conducting track that comprises the section that is embodied as the sacrificial structure. This measurement can be performed by way of example by the integrated switching device.

In the case of an expedient embodiment, the method comprises providing an electrically insulating connecting layer that connects the integrated switching device, the substrate and the section of the conducting track, said section being embodied as the sacrificial structure, and the sacrificial structure can be destroyed by means of said electrically insulating connecting layer as the integrated switching device is removed.

Reference is made to the fact that the embodiments of the invention are described with reference to different subjects of the invention. In particular, some embodiments of the invention are described by device claims and other embodiments of the invention are described by method claims. However, it is immediately clear to the person skilled in the art when reading this application that, unless explicitly mentioned otherwise, in addition to a combination of features that belong to one type of subject of the invention, any combination of features that belong to different types of subjects of the invention is possible.

BRIEF DESCRIPTION OF THE SEVERAL VIEWS OF THE DRAWING

Further advantages and features of the present invention are evident from the following exemplary exemplified embodiments that are described in conjunction with the figures.

DESCRIPTION OF THE INVENTION

Figure 1:
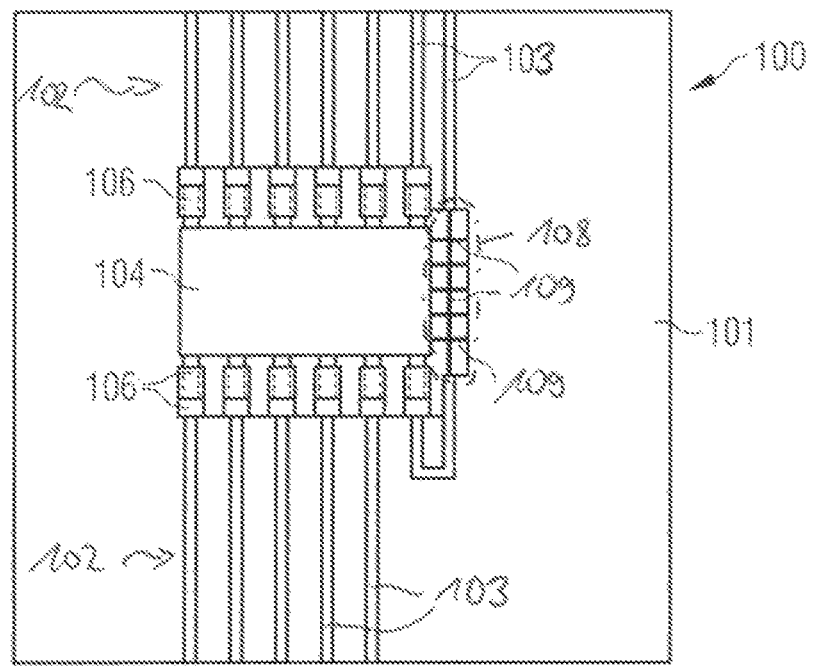
FIG. 1 illustrates in a schematic plan view a control unit in accordance with a first exemplary embodiment during a stage of its manufacturing process.

Reference is made to the fact that like or like-functioning features or rather components of different exemplary embodiments are provided with like reference numerals. In order to avoid unnecessary repetitions, any features or rather components that have already been described with reference to a previously described embodiment are not explained in detail at a subsequent point.

Furthermore, reference is made to the fact that the exemplary embodiments that are described hereinunder represent only a limited selection of possible design variants of the invention. In particular, it is possible to combine the features of individual exemplary embodiments with one another in a suitable manner so that for a person skilled in the art a multiplicity of different embodiments are to be regarded as obviously disclosed by the design variants that are illustrated here in an explicit manner.

FIG. 1 illustrates a schematic plan view of a control unit 100 in accordance with a first exemplary embodiment during a stage of its manufacturing process.

The control unit 100 comprises a substrate 101 having an electrically conductive structure 102. The electrically conductive structure is formed in this case by a plurality of conducting tracks 103 that are applied to the substrate 101. The substrate 101 having the conducting tracks 103 represents by way of example a circuit board for example a printed circuit board.

The substrate 101 having the electrically conductive structure 102 further comprises a sacrificial structure 108. The sacrificial structure 108 is formed in this case by a section of one of the conducting tracks 103. The section of this conducting track that is embodied as the sacrificial structure 108 has a lattice-like structure in the case of the present exemplary embodiment. In other words, said section comprises segments 109 that in each case have a cross section that is reduced by at least 50% in comparison to the conducting track 103 in a further section that is adjacent to the section that is embodied as the sacrificial structure 108.

Figure 4:
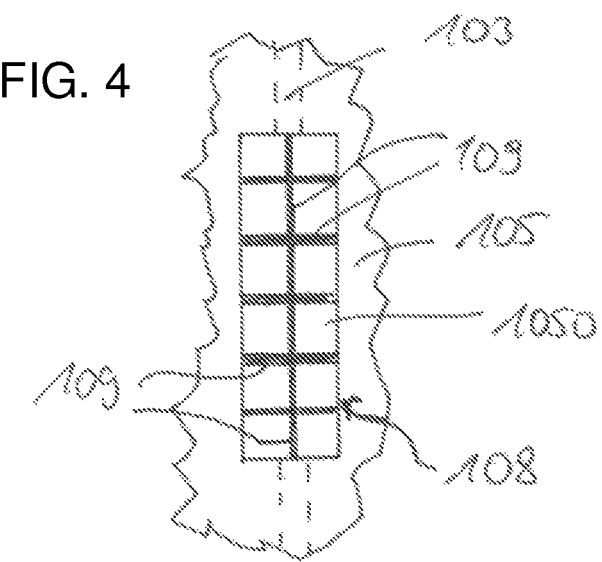
FIG. 4 illustrates a cut-out of the schematic plan view of FIG. 1.

FIG. 4 illustrates that the conducting tracks in the case of the present exemplified embodiment are covered by a lacquer coat 105 of a solder resist, wherein at least connecting surfaces are laid bare for the purpose of connecting an integrated switching device 104. The lacquer coat 105 is incidentally omitted for the purpose of improving the illustration.

The lacquer coat 105 has an opening 1050 so that the conducting track section 108 that is embodied as the sacrificial structure 108 is not covered to a great extent or completely by the lacquer coat 105. Said section can be surrounded on all sides by the lacquer coat 105.

An integrated switching device 104 is mounted in an electrically conductive manner on the substrate 101 by means of solder connections 106. The integrated switching device 104 is also connected in an electrically conductive manner to the conducting tracks 1023 by means of solder connections 106. The sacrificial structure 108 is arranged as seen in the plan view of a main surface of the substrate 101 at the side adjacent to the integrated switching device 104.

Figure 2:
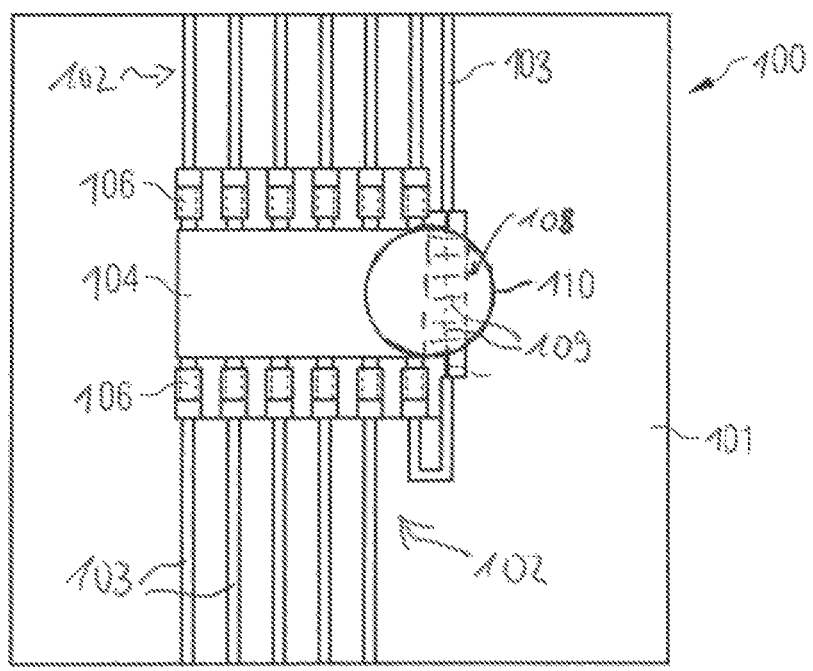
FIG. 2 illustrates in a schematic plan view the finished control unit in accordance with the first exemplary embodiment.

FIG. 2 illustrates the finished control unit 100 of the first exemplary embodiment.

A connecting layer 110 connects one part of the sacrificial structure 108 to a part of the integrated switching device 104. The connecting layer 110 covers the integrated switching arrangement 104 in places as seen in the plan view of a main surface of the substrate 101 and is adjacent at these places to the integrated switching arrangement 104. The connecting layer 110 is applied from these places at the side adjacent to the integrated switching arrangement 104 so that said connecting layer fills the opening 1050 at least in part and in the opening is adjacent to the substrate 101 and to the section 108 of the conducting track 103, said section being embodied as the sacrificial structure 108. In particular, adhesion between the material of the connecting structure 110 and the sacrificial structure 108 is greater than an adhesion between the substrate 101 and the sacrificial structure 108.

Figure 3:
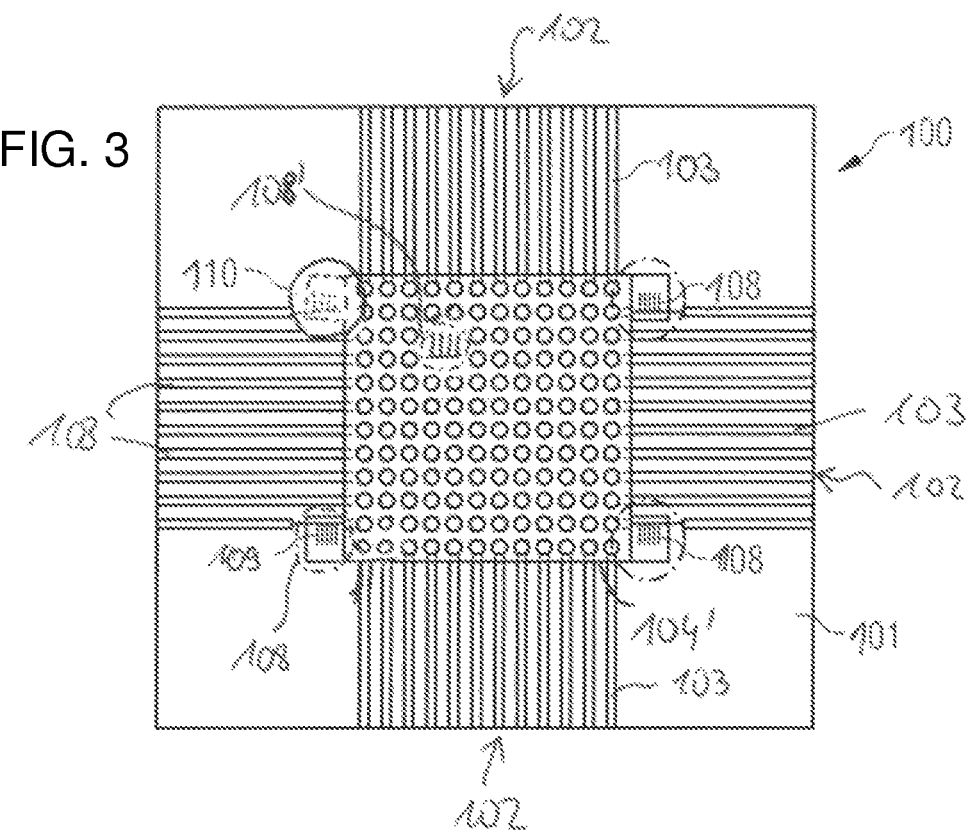
FIG. 3 illustrates in a schematic plan view a substrate having an electrically conductive structure for a control unit in accordance with a further exemplary embodiment.

FIG. 3 illustrates a schematic plan view of a substrate 101 having an electrically conductive structure 102 of a control unit 100 in accordance with a further exemplary embodiment. The integrated switching device 104 that is mounted in an electrically conductive manner on the substrate 101 is omitted for the purpose of simplifying the illustration. In lieu thereof, the assembly region—that is square in this case— and is covered by the integrated switching device 104 is designated by the reference numeral 104'.

In the case of the present exemplary embodiment, some of the conducting tracks 103 extend on the surface 101 of the substrate, other conducting tracks extend at least in places within the substrate 101. By way of example, the substrate 101 having an electrically conductive structure 102 is in this case a multi-layer circuit board.

Whereas in the case of the first exemplary embodiment, the solder connections 106 are arranged at least in part at the side adjacent to a base body—in particular a housing—of the integrated switching device 104, the solder connecting sites 106 are covered in this case as seen in a plan view of a main surface of the substrate 101 by the base body or rather the housing of the integrated switching device 104. Electrical connecting sites of the conducting tracks 103 that extend in places within the substrate 101 are provided in an expedient manner in the assembly region 104' on an outer surface—in particular on a main surface—of the substrate 101. The substrate 101 comprises multiple sacrificial structures 108 that are designed so as to be irreversibly destroyed if the integrated switching device 104 is removed from the substrate 301. As in the case of the first exemplary embodiment, the sacrificial structures 108 are formed in each case by sections of conducting tracks 103 of the electrically conductive structure 102. The sections comprise in this case multiple segments 109 in such a manner that they have a mesh-like form.

Some of the sections 108 that are embodied as sacrificial structures are arranged at the side adjacent to the assembly area 104' and consequently are arranged at the side adjacent to the integrated switching device 104. In this case, said sections are arranged adjacent to the four corners of the switching device 104 that as seen in the plan view is rectangular, in particular square. As is the case in the first exemplary embodiment, a connecting layer 110 is applied from an upper face of the integrated switching device 104 adjacent thereto into the respective opening 1050 of the solder resist lacquer coat 105 in order to produce at this site a connection to the respective sacrificial structure 108 and the substrate 101. This is indicated by way of example in the left upper corner of FIG. 3.

A material of the connecting layer 110 connects one part of the sacrificial structure 108 to one part of the integrated switching device 104. In particular, the magnitude of the adhesive property of the material of the connecting layer 110 is selected so that as the integrated switching device 104 is removed from the substrate 101 at least one part of the sacrificial structures 108 is destroyed.

As an alternative or in addition thereto, one section 108' of a conducting track 103 is provided, said section being embodied as a sacrificial structure and arranged within the assembly region 104' in such a manner that it is covered by the integrated switching device 104 as seen in the plan view of the main surface of the substrate 101, said main surface facing towards the assembly region 104'. As in the case of the sacrificial structures 108 that are arranged at the side of the switching device 104, the control unit 100 comprises in an expedient manner a connecting layer 110 that connects the integrated switching device 104 to the sacrificial structure 108' and the substrate 101. The connecting layer 110 can in this case be completely covered by the integrated switching device 104. A control unit having a sacrificial structure 108' that is arranged in this manner is particularly difficult to manipulate without destroying the sacrificial structure 108'.

In addition, reference is made to the fact that the term 'comprising' does not exclude other elements or steps and 'one' or 'a' does not exclude a multiplicity. Reference numerals in the claims are not to be regarded as limiting.

The invention claimed is:

1. A control unit, comprising:
a substrate having a surface;
an electrically conductive structure applied to said surface of said substrate, said electrically conductive structure having a plurality of conducting tracks applied to said surface of said substrate, one of said plurality of conducting tracks including a section with a sacrificial structure formed as a lattice on said surface of said substrate;
an integrated circuit device mounted in an electrically conductive manner on said surface of said substrate, said sacrificial structure configured so as to be irreversibly destroyed if said integrated circuit device is removed from said substrate; and
an electrically insulating connecting layer disposed on top of said integrated circuit device, said substrate and said sacrificial structure;
said one of said plurality of conducting tracks including a solder connection electrically connecting said one of said plurality of conducting tracks to said integrated circuit device;
said lattice of said one of said plurality of conducting tracks being separate from said solder connection; and
said electrically insulating connecting layer having an adhesive property in such a manner that an adhesion between said electrically insulating connecting layer and said sacrificial structure is greater than an adhesion between said substrate and said sacrificial structure.

2. The control unit according to claim 1, wherein said electrically insulating connecting layer covers said integrated circuit device in places, is drawn from said integrated circuit device onto said substrate laterally from said integrated circuit device and onto said section of said conducting track embodied as said sacrificial structure.

3. The control unit according to claim 1, wherein said sacrificial structure is covered by said integrated circuit device.

4. The control unit according to claim 1, wherein said conducting track is covered in places by a lacquer coat and said lacquer coat has an opening formed therein by means of which said section of said conducting track embodied as said sacrificial structure is exposed.

5. The control unit according to claim 4, wherein said electrically insulating connecting layer fills said opening of said lacquer coat at least in part so that said electrically insulating connecting layer in said opening adjoins said substrate and said section of said electrically insulating conducting track embodied as said sacrificial structure.

6. The control unit according to claim 1, wherein said sacrificial structure is configured such that destroying said sacrificial structure can be detected visually, haptically, or electrically.

7. The control unit according to claim 1, wherein said sacrificial structure is configured so that as said sacrificial structure is destroyed, a loss of function of the control unit occurs.

8. The control unit according to claim 1, wherein said electrically insulating connecting layer contains an organic material or is embodied from an organic material.

9. The control unit according to claim 1, wherein said integrated circuit device contains a storage medium and also a micro-controller and/or micro-processor embodied in a monolithically integrated manner with said storage medium.

10. A vehicle, comprising:
a control unit, containing:
a substrate having a surface;
an electrically conductive structure applied to said surface of said substrate, said electrically conductive structure having a plurality of conducting tracks applied to said surface of said substrate, one of said plurality of conducting tracks including a section with a sacrificial structure formed as a lattice on said surface of said substrate;
an integrated circuit device mounted in an electrically conductive manner on said surface of said substrate, said sacrificial structure configured so as to be irreversibly destroyed if said integrated circuit device is removed from said substrate; and
an electrically insulating connecting layer disposed on top of said integrated circuit device, said substrate and said sacrificial structure;
said one of said plurality of conducting tracks including a solder connection electrically connecting said one of said plurality of conducting tracks to said integrated circuit device;
said lattice of said one of said plurality of conducting tracks being separate from said solder connection; and
said electrically insulating connecting layer having an adhesive property in such a manner that an adhesion between said electrically insulating connecting layer and said sacrificial structure is greater than an adhesion between said substrate and said sacrificial structure.

11. A method for detecting manipulation of a control unit, which comprises the steps of:
providing a substrate having an electrically conductive structure applied to a surface of the substrate, the electrically conductive structure having a plurality of conducting tracks applied to the surface of the substrate, one of the plurality of conducting tracks including a section with a sacrificial structure formed as a lattice on the surface of the substrate;
providing an integrated circuit device mounted in an electrically conductive manner on the surface of the substrate, wherein the one of the plurality of conducting tracks includes a solder connection electrically connecting the one of the plurality of conducting tracks to the integrated circuit device, and the lattice of the one of the plurality of conducting tracks is separate from the solder connection;
configuring the sacrificial structure to be irreversibly destroyed if the integrated circuit device is removed from the substrate;
forming an electrically insulating connecting layer disposed on top of the integrated circuit device, the substrate and the sacrificial structure;
providing the electrically insulating connecting layer with an adhesive property in such a manner that an adhesion between the electrically insulating connecting layer and the sacrificial structure is greater than an adhesion between the substrate and the sacrificial structure; and
detecting manipulation of the control unit by testing a condition of the sacrificial structure.

12. The method according to claim 11, wherein the testing of the condition of the sacrificial structure includes measuring an electrical conductivity of the conducting track.

* * * * *